United States Patent
Oh et al.

(10) Patent No.: US 10,374,247 B2
(45) Date of Patent: Aug. 6, 2019

(54) POROUS SUPPORT, PREPARATION METHOD THEREFOR, AND REINFORCED MEMBRANE CONTAINING SAME

(71) Applicant: KOLON FASHION MATERIAL. INC., Gwacheon-si, Gyeonggi-do (KR)

(72) Inventors: Heung Ryul Oh, Seoul (KR); Sung Jin Kim, Gumi-si (KR); Yong Hwan Lee, Daegu (KR); Hwan Kwon Rho, Gumi-si (KR); Chul Ki Kim, Gumi-si (KR); Jeong Young Choi, Busan (KR); Jun Young Park, Gumi-si (KR); Ji Suk Baek, Gumi-si (KR)

(73) Assignee: KOLON FASHION MATERIAL. INC., Gwacheon-si (KR)

( * ) Notice: Subject to any disclaimer, the term of this patent is extended or adjusted under 35 U.S.C. 154(b) by 134 days.

(21) Appl. No.: 15/119,040

(22) PCT Filed: Feb. 24, 2015

(86) PCT No.: PCT/KR2015/001764
§ 371 (c)(1),
(2) Date: Aug. 15, 2016

(87) PCT Pub. No.: WO2015/130061
PCT Pub. Date: Sep. 3, 2015

(65) Prior Publication Data
US 2016/0359184 A1    Dec. 8, 2016

(30) Foreign Application Priority Data
Feb. 25, 2014   (KR) .................. 10-2014-0021935

(51) Int. Cl.
*H01M 8/1062*   (2016.01)
*D04H 1/4382*   (2012.01)
(Continued)

(52) U.S. Cl.
CPC ........ *H01M 8/1062* (2013.01); *D04H 1/4342* (2013.01); *D04H 1/4382* (2013.01);
(Continued)

(58) Field of Classification Search
CPC ......... H01M 8/1062; D06C 7/00; D04H 1/54; D04H 1/728; D04H 1/4382
See application file for complete search history.

(56) References Cited

U.S. PATENT DOCUMENTS

| 2013/0005940 A1* | 1/2013 | Dennes ................ H01M 2/145 528/353 |
| 2013/0177834 A1* | 7/2013 | Lee ........................ C08J 5/2275 429/494 |
| 2014/0154594 A1 | 6/2014 | Lee et al. |

FOREIGN PATENT DOCUMENTS

| JP | 2013536323 A | 9/2013 |
| JP | 2013544323 A | 12/2013 |

(Continued)

OTHER PUBLICATIONS

International Searching Authority, International Search Report of PCT/KR2015/001764 dated May 14, 2015.

(Continued)

*Primary Examiner* — Karie O'Neill Apicella
(74) *Attorney, Agent, or Firm* — Sughrue Mion, PLLC

(57) ABSTRACT

The present invention relates to a porous support, a preparation method therefor, and a reinforced membrane containing the same, wherein the porous support comprises a nanoweb in which nanofibers are integrated in the form of a nonwoven fabric comprising a plurality of pores, and the nanoweb has an elongation at break of 1-10%. The porous support has excellent air permeability and water permeability, remarkable durability, heat resistance and chemical resistance, and excellent mechanical strength and processability.

13 Claims, 1 Drawing Sheet

(51) Int. Cl.
    *D04H 1/54* (2012.01)
    *D04H 1/728* (2012.01)
    *D06C 7/00* (2006.01)
    *D04H 1/4342* (2012.01)
    *D06C 3/00* (2006.01)
    *D06C 15/00* (2006.01)

(52) U.S. Cl.
    CPC .............. *D04H 1/54* (2013.01); *D04H 1/728* (2013.01); *D06C 3/00* (2013.01); *D06C 7/00* (2013.01); *D06C 15/00* (2013.01)

(56) References Cited

FOREIGN PATENT DOCUMENTS

| | | |
|---|---|---|
| KR | 10-2011-0072006 A | 6/2011 |
| KR | 10-2011-0120185 A | 11/2011 |
| KR | 10-2011-0129113 A | 12/2011 |
| KR | 10-2013-0013747 A | 2/2013 |
| WO | 2012088205 A1 | 6/2012 |

OTHER PUBLICATIONS

Japan Patent Office, Communication dated Sep. 5, 2017, issued in corresponding Japanese Application No. 2016-553858.

* cited by examiner

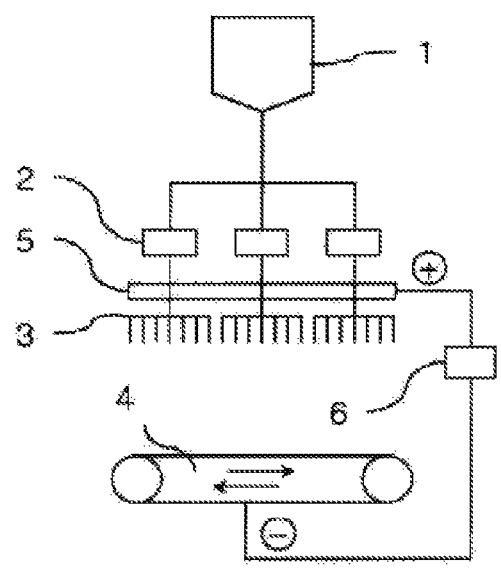

US 10,374,247 B2

POROUS SUPPORT, PREPARATION METHOD THEREFOR, AND REINFORCED MEMBRANE CONTAINING SAME

CROSS REFERENCE TO RELATED APPLICATIONS

This application is a National Stage of International Application No. PCT/KR2015/001764 filed Feb. 24, 2015, claiming priority based on Korean Patent Application No. 10-2014-0021935 filed Feb. 25, 2014, the contents of all of which are incorporated herein by reference in their entirety.

TECHNICAL FIELD

The present invention relates to a porous support, a method of manufacturing the same, and a reinforced membrane comprising the same. More particularly, the present invention relates to a porous support which exhibits superior gas permeability and water permeability, excellent durability, heat resistance and chemical resistance, and superior mechanical strength and formability, a method of manufacturing the same, and a reinforced membrane comprising the same.

BACKGROUND ART

Nanofibers are used in a variety of applications such as filters for water purification, filters for air purification, composites, membranes for cells and the like, in particular, reinforced composite membranes for fuel cells for cars, due to wide surface area and excellent porosity.

A fuel cell is an electrochemical device which is operated from hydrogen and oxygen as fuels, which arises as an environmentally friendly device because its products are pure water and recyclable heat. In addition, it is widely used as power sources for household, car and power generation applications and the like owing to advantages such as easy operation, high output density and non-noise.

Depending on the type of electrolyte membrane, the fuel cell is classified into an alkaline electrolyte fuel cell, a direct oxidation fuel cell, a polymer electrolyte membrane fuel cell (PEMFC) and the like. Of these, the polymer electrolyte membrane fuel cell generates electricity based on transfer of hydrogen ions ($H^+$) from an oxidation electrode (anode) to a reduction electrode (cathode), which can operate at room temperature and have an advantage of short activation time, as compared to other fuel cells.

A polymer electrolyte membrane fuel cell includes an electricity generator which includes a membrane electrode assembly (MEA) which is provided with an oxidation electrode and a reduction electrode which are opposite to each other based on a polymer electrolyte membrane fuel cell interposed therebetween, and a separator (also, referred to as a "bipolar plate"), a fuel supply to supply a fuel to the electricity generator, and an oxidizing agent supply to supply an oxidizing agent such as oxygen or air to the electricity generator.

A polymer electrolyte membrane is a conductor of hydrogen ions and may be classified into a single membrane including a polymer such as a fluorine- or hydrocarbon-based polymer and a composite membrane including a composite of the polymer with an organic/inorganic substance, a porous support or the like. The most generally used single membrane is Nafion™ available from DuPont which is a perfluorine-based polymer. However, Nafion™ has drawbacks of high price, low mechanical shape stability, and high membrane resistance due to high thickness.

In order to solve these drawbacks, a research is underway on composite membranes with reinforced mechanical shape stability. Of composite membranes, a pore-filling membrane including a porous support impregnated with an ion conductor is actively researched due to low price as well as excellent performance and mechanical shape stability.

The support generally used for pore-filling membranes is polytetrafluoroethylene (PTFE). However, a PTFE support has superior chemical resistance, but has a drawback of low porosity of 40 to 60%.

PRIOR ART DOCUMENT

Patent Document

1) Korean Patent Laid-open Publication No. 2011-0120185 (published on Nov. 3, 2011)

DISCLOSURE

Technical Problem

Therefore, it is an object of the present invention to provide a porous support which exhibits superior gas permeability and water permeability, excellent durability, heat resistance and chemical resistance, and superior mechanical strength and formability.

It is another object of the present invention to provide a method of manufacturing the porous support.

It is another object of the present invention to provide a reinforced membrane comprising the porous support.

Technical Solution

In accordance with an aspect of the present invention, the above and other objects can be accomplished by the provision of a porous support including a nanoweb in which nanofibers are integrated in the form of a non-woven fabric including a plurality of pores, wherein the nanoweb has a porosity of 70 to 95% and an elongation at break of 1 to 10%.

The nanoweb may have a tensile strength of 10 to 50 MPa, a mean thickness of 5 to 50 μm and a basis weight of 2 to 10 $g/cm^2$. In addition, the nanoweb may have an intermediate elongation of 0.7 to 5% under a load of 10.204 gf.

In an embodiment, the nanoweb may be a polyimide nanoweb.

In another aspect of the present invention, provided is a method of manufacturing a porous support including spinning a spinning solution to form a nanoweb precursor which includes in which nanofibers are integrated in the form of a non-woven fabric including a plurality of pores, and curing the nanoweb precursor while transferring the nanoweb precursor by a roll-to-roll method under the condition that a MD tension is equal to a TD tension.

The spinning solution may be a solution containing polyamic acid having a solid content of 11.5 to 13.5% by weight.

The method may further include calendering the nanoweb precursor at a linear pressure of 80 to 200 kgf/cm before curing the nanoweb precursor.

The curing the nanoweb precursor may include curing the nanoweb precursor to adjust a transverse direction curing shrinkage of the nanoweb precursor to 5 to 15%. In addition, the curing the nanoweb precursor may be carried out at a temperature of 80 to 650° C.

The transferring the nanoweb precursor by a roll-to-roll method may include transferring the nanoweb precursor by a roll-to-roll method without tension, or may be carried out while applying a tension identical to tension, which is applied to the machine direction of the nanoweb precursor, in the transverse direction of the nanoweb precursor with a roller, after rolling the nanoweb precursor with the roller.

In another aspect of the present invention, provided is a reinforced membrane including the porous support according to the present invention and an ion exchange polymer filling pores of the porous support.

Other details of embodiments of the present invention are incorporated in the Detailed Description of the Invention described below.

Effects of the Invention

The porous support according to the present invention exhibits superior gas permeability and water permeability, excellent durability, heat resistance and chemical resistance, and superior mechanical strength and formability.

DESCRIPTION OF DRAWINGS

The above and other objects, features and other advantages of the present invention will be more clearly understood from the following detailed description taken in conjunction with the accompanying drawings, in which:

FIG. 1 is a schematic view illustrating a nozzle-type electrospinning device.

BEST MODE

Hereinafter, embodiments of the present invention will be described in detail. These embodiments are provided only as examples and should not be construed as limiting the scope and spirit of the present invention. The present invention is defined only by the scope of claims given later.

The terms used herein are used merely to describe specific embodiments, but are not intended to limit the present invention. The singular expressions include plural expressions unless explicitly stated otherwise in the context thereof. It should be appropriated that in this application, the terms "include(s)," "comprise(s)", "including" and "comprising" are intended to denote the presence of the characteristics, numbers, steps, operations, elements, or components described herein, or combinations thereof, but do not exclude the probability of presence or addition of one or more other characteristics, numbers, steps, operations, elements, components, or combinations thereof.

As used herein, the term "nano" means a nano-scale and covers a size of 5,000 nm or less.

As used herein, the term "diameter" means a length of a short axis passing through a center of a fiber and the term "length" means a length of a long axis passing through the center of the fiber.

The porous support according to an embodiment of the present invention includes a nanoweb which includes nanofibers integrated in the form of a non-woven fabric including a plurality of pores.

The nanofibers preferably include a hydrocarbon-based polymer which exhibits superior chemical resistance and hydrophobicity and is thus free from shape deformation by moisture under high humidity environments. Specifically, the hydrocarbon-based polymer may be selected from the group consisting of nylon, polyimide, polyaramide, polyether imide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamide-imide, polyethylene terephthalate, polyethylene, polypropylene, a copolymer thereof and a mixture thereof. Of these, polyimide which exhibits relatively better heat resistance, chemical resistance and shape stability is preferably used.

The porous support, for example, includes an assembly of nanofibers, in which the nanofibers produced by electrospinning are randomly arranged, that is, a nanoweb. The nanofibers preferably have a mean diameter of 40 to 5,000 nm, wherein the mean diameter is obtained as an average of the diameters of 50 nanofibers measured with a scanning electron microscope (JSM6700F, JEOL) in consideration of porosity and thickness of the nanoweb. When the mean diameter of the nanofibers is lower than 40 nm, mechanical strength of the porous support may be deteriorated and, when the mean diameter of the nanofibers exceeds 5,000 nm, porosity may be decreased and thickness may be increased.

The nanoweb includes the nanofibers described above, thereby having a porosity of 70 to 95%, 75 to 95%, 80 to 95% or 80 to 88%. As the porous support has a porosity of 50% or more, specific surface area of the porous support increases, thus facilitating impregnation of the ionic conductor upon application to a separation membrane and, as a result, improving efficiency of cells. Meanwhile, the nanoweb preferably has a porosity of less than the range defined above. When the porosity of the porous support is not within the range defined, subsequent processes may not be efficiently performed due to deterioration in shape stability. The porosity may be calculated by a method known in the art and is for example in accordance with ISO 15901-1:2005 (Mercury porosimetry). In addition, in another example, the porosity is calculated as a ratio of an air volume with respect to a total volume of the porous support in accordance with the following Equation 1. In this case, the total volume is calculated by producing a rectangular porous support sample and measuring the width, length and thickness of the sample, and the air volume is obtained by measuring a weight of the sample and subtracting a polymer volume, calculated back from polymer density, from the total volume.

Porosity(*)=(Air volume in porous support/Total volume of porous support)×100    [Equation 1]

In addition, the porous support may have a mean thickness of 5 to 40 μm. When the thickness of the porous support is less than 5 μm, mechanical strength and dimensional stability may be significantly deteriorated upon application to a separation membrane and, on the other hand, when the thickness exceeds 40 μm, resistance loss may increase upon application to the separation membrane and weight reduction and integration may be deteriorated. More preferably, the nanoweb may have a mean thickness of 10 to 30 μm. The mean thickness of the nanoweb may be an average of thicknesses of the produced nanoweb and the thickness of the nanoweb may be measured by a method known in the art. For example, the thickness of the nanoweb may be measured in accordance with KS K ISO 9073-2 (method of measuring a thickness of a non-woven fabric).

The nanoweb having the porosity and thickness described above may have a basis weight of 2 to 10 g/cm$^2$. When the basis weight of the nanoweb is less than 2 g/cm$^2$, mechanical strength and dimensional stability may be significantly deteriorated upon application to a separation membrane and, when the basis weight exceeds 10 g/cm$^2$, porosity may be deteriorated. More preferably, the nanoweb has a basis weight of 4 to 8 g/cm$^2$.

Preferably, the nanoweb has an elongation at break of 1 to 10% to ensure a working process required to be utilized in a variety of applications. When the elongation at break of the nanoweb is less than 1%, the edge of the porous support may be broken upon application to an electrochemical device and, when the elongation at break exceeds 10%, formability, use stability and dimensional variation may not be preferable. The elongation at break is measured by applying a 1 kg load cell to a nanoweb having a width of 25 mm (TD) and a length of 100 mm (MD), which are the conditions in accordance with KS M 7272, using an Instron 5566 tester by the method in accordance with KS K 0521, applying tension at a constant rate of 100 mm per minute and calculating a ratio of an elongated length at break as a percentage.

The nanoweb may have an intermediate elongation of 0.7 to 5% under the load of 10.204 gf. When the intermediate elongation of the nanoweb is less than 0.7%, work stability and operation stability of the electrochemical device may be deteriorated and, when the intermediate elongation exceeds 5%, formability, use stability and dimensional variation may not be preferable. The intermediate elongation may be measured in the same manner as the measurement of elongation at break, except that a ratio of elongated length under the load of 10.204 gf is represented as a percentage (%).

The nanoweb may have a tensile strength of 10 to 50 MPa, 10 to 40 MPa, 10 to 35 MPa, 15 to 50 MPa, 20 to 50 MPa, 15 to 40 MPa or 20 to 35 MPa. When the tensile strength of the nanoweb is less than the range defined above, the nanoweb may be broken upon application to the separation membrane, or the nanoweb may be damaged and the lifespan of the electrochemical device may be shortened upon operation of the electrochemical device to which the separation membrane is applied and, when tensile strength exceeds the ranged defined above, other physical properties of the nanoweb cannot be controlled within desired ranges. The tensile strength may be measured by applying a 1 kg load cell to a nanoweb having a width of 25 mm (TD) and a length of 100 mm (MD), which satisfies the condition in accordance with KS M 7272, using an Instron 5566 tester by the method in accordance with KS K 0521, applying tension at a constant rate of 100 mm per minute and converting a strength (kgf) at break into MPa.

In order that the nanoweb includes nanofibers having superior porosity and an optimal diameter, has a thickness, is easily produced and exhibits superior tensile strength, the polymer constituting the nanoweb preferably has a weight average molecular weight of 30,000 to 500,000 g/mol. When the weight average molecular weight of the polymer constituting the nanoweb is less than 30,000 g/mol, porosity and thickness of the nanoweb can be easily controlled, but porosity and tensile strength may be deteriorated. On the other hand, the weight average molecular weight of the polymer constituting the nanoweb exceeds 500,000 g/mol, heat resistance may be slightly improved, but the manufacture process does not smoothly proceed and porosity may be deteriorated.

In addition, as the nanoweb has a weight average molecular weight satisfying the range defined above and the polymer precursor is converted into the polymer under optimal curing conditions, it has heat resistance of 180° C. or more, preferably 300° C. or more. When the heat resistance of the nanoweb is less than 180° C., the nanoweb may be readily deformed at a high temperature due to degraded heat resistance and, as a result, performance of the electrochemical device produced using the same may be deteriorated. In addition, when heat resistance of the nanoweb is degraded, the nanoweb may be deformed by abnormal heating and performance thereof may be deteriorated, in serious cases, the nanoweb may be disadvantageously broken and exploded.

The nanoweb is insoluble in an organic solvent at room temperature to 100° C. and is thus chemically stable. The organic solvent may be an ordinary organic solvent such as NMP, DMF, DMAc, DMSO or THF.

The nanoweb may have a strain of 10 length % or less, preferably 5 length % or less. The strain may be obtained by standing a nanoweb sample with a width 100 mm and a length of 100 mm at 200° C. for 24 hours and calculating an average of width and length strains before and after standing. When the strain exceeds 10 length %, dimensional stability of the support may be deteriorated and shape deformation may occur under high temperature environments.

When the nanoweb includes polyimide, the imide conversion may be 90% or more, preferably 99% or more. The imide conversion may be measured by measuring an infrared spectrum of the nanoweb and calculating a ratio of imide C—N absorbance at 1,375 cm$^{-1}$ to a p-substituted C—H absorbance at 1,500 cm$^{-1}$. When the imide conversion is less than 90%, physical properties are deteriorated and shape stability cannot be secured due to un-reacted substance.

The nanoweb has air permeability of 50 to 250 lpm, preferably 100 to 150 lpm. The air permeability may be measured in accordance with the method of ISO 9237. When the air permeability is less than 50 lpm, absorption of electrolyte may be difficult and, when the air permeability exceeds 250 lpm, the electrolyte may not be sufficiently incorporated.

In an embodiment, preferably, the nanoweb has a porosity of 70 to 95% and an elongation at break of 1 to 10%. When a porous support including the nanoweb is applied to a separation membrane, superior work stability can be provided during manufacture of the electrochemical device, and superior performance and operation stability can be provided upon operation of the electrochemical device. When the porous support is used as a separation membrane for electrochemical devices, a polymer electrolyte for fuel cells, a secondary battery, or a separation membrane for electrolysis devices or capacitors. In particular, the porous support is applied to the polymer electrolyte for fuel cells, thereby significantly improving work stability upon manufacture of the membrane electrode assembly. In addition, the porous support can prevent the edge of membrane electrode assemblies from being broken when the membrane electrode assemblies are assembled by connection in series or parallel.

However, the application of the porous support is not limited to the separation membrane of the electrochemical device. The porous support has superior gas permeability and water permeability as well as excellent heat resistance and chemical resistance, thus being useful for filter materials for gas or liquid filters, filter materials for dustproof masks, materials for filters such as vents for cars, vents for cellular phones and vents for printers, materials for high-quality clothing such as moisture-permeable waterproof fabrics, and medical materials such as dressings for wound treatment, supports for artificial vessels, bandages, and masks for cosmetics which require heat resistance and chemical resistance.

A method of manufacturing a porous support according to an embodiment of the present invention includes spinning a spinning solution to form a nanoweb precursor which includes nanofibers integrated in the form of a non-woven fabric including a plurality of pores, and curing the nanoweb precursor while transferring the nanoweb precursor by a roll-to-roll method under the condition that a MD tension is equal to a TD tension.

For example, when the nanofibers include polyimide as a hydrophobic polymer, the method of manufacturing a porous support includes adding a polymer polymerized from diamine and dianhydride to a solvent to prepare a spinning solution, spinning the prepared spinning solution to produce a polyamic acid nanoweb integrated in the form of a non-woven fabric including a plurality of pores, and imidizing the polyamic acid nanoweb to produce a polyimide nanoweb.

Hereinafter, the respective steps will be described. The spinning solution is a solution which contains a polymer for forming the nanofibers, the polymer for forming the nanofibers is preferably capable of forming a hydrocarbon-based polymer, which exhibits superior chemical resistance and hydrophobicity and is thus free from shape deformation by moisture under high humidity environments. Specifically, the hydrocarbon-based polymer may include the types of polymers described above. In addition, the polymer for forming the hydrocarbon-based polymer is preferably a polymer which is capable of forming a polyimide which exhibits further superior heat resistance, chemical resistance and shape stability.

The polymer for forming polyimide is polyamic acid (PAA) which is a polyimide precursor which is readily dissolved in an organic solvent. In addition, after the polyamic acid nanoweb is produced, the polyamic acid reacts with imide during subsequent curing to produce a nanoweb containing polyimide.

The polyamic acid nanoweb may be produced by an ordinary production method, specifically, by polymerizing diamine and dianhydride to produce polyamic acid and then spinning a spinning solution containing a mixture of polyamic acid with a solvent.

The dianhydride may be selected from the group consisting of pyromellitic dianhydride (PMDA), 3,3',4,4'-benzophenonetetracarboxylic dianhydride (BTDA), 4,4'-oxydiphthalic anhydride (ODPA), 3,4,3',4'-biphenyltetracarboxylic dianhydride (BPDA), and bis(3,4-dicarboxyphenyl)dimethylsilane dianhydride (SiDA) and mixtures thereof. In addition, the diamine may be selected from the group consisting of 4,4'-oxydianiline (ODA), 1,3-bis(4-aminophenoxy)benzene (RODA), p-phenylene diamine (p-PDA), o-phenylene diamine (o-PDA) and mixtures thereof. The solvent used for dissolving the poly(amic acid) may be selected from the group consisting of m-cresol, N-methyl-2-pyrrolidone (NMP), dimethylformamide (DMF), dimethylacetamide (DMAc), dimethylsulfoxide (DMSO), acetone, diethyl acetate, tetrahydrofuran (THF), chloroform, γ-butyrolactone and mixtures thereof.

The weight average molecular weight of the polymer for forming the nanofibers polymerized from the monomers can be controlled, like the polymer constituting the nanoweb.

The polymer for forming nanofibers is preferably present in an amount of 11.5 to 13.5% by weight with respect to the total weight of the spinning solution. When the content of the polymer is less than the range defined above, the porous support having an elongation at break described above cannot be produced and, on the other hand, when the content of the polymer exceeds the range defined above, the porous support having porosity cannot be produced.

In step 2, the spinning solution is spun to produce a nanoweb precursor, that is, a polyamic acid nanoweb. There is no particular limitation as to spinning in the present invention, and the spinning is electrospinning, electro-blown spinning, centrifugal spinning or melt blowing or the like, preferably, electrospinning.

Hereinafter, an example of using electrospinning will be described in detail.

FIG. 1 is a schematic view illustrating a nozzle-type electrospinning device. Referring to FIG. 1, in accordance with electrospinning, a predetermined amount of the spinning solution is supplied from a solution tank 1 storing the spinning solution to a nozzle 3 using a volumetric pump 2 and the spinning solution is ejected through the nozzle 3 to form nanofiber precursors. At this time, the nanofiber precursors are scattered and, at the same time, coagulated. The coagulated nanofiber precursors are collected on the collector 4 to produce a nanoweb precursor.

In this case, the electrospinning may be carried out under the conditions that a positive charge density near the nozzle is increased and a negative charge density near the collector is increased. As a result, when polymer droplets are spun and scattered, they repel one another, so that they can be advantageously collected as nanofibers. Near the nozzle or near the collector may mean an area which is within 10 cm from the surface of the nozzle or the collector, but the present invention is not particularly limited thereto.

Specifically, the positive charge density near the nozzle can be controlled by installing a high-voltage generator (not shown) for supplying a positive charge near the nozzle and the negative charge density near the collector can be controlled by installing a high-voltage generator (not shown) for supplying a negative charge near the collector.

A level of increasing the positive charge density near the nozzle can be controlled by supplying a positive charge of +10 to +100 kV near the nozzle, and a level of increasing the negative charge density near the collector can be controlled by supplying a negative charge of 0 to −100 kV near the collector. When the amount of the supplied positive charge is less than +10 kV, spinning capability may not be sufficient, when the amount exceeds +100 kV, electrical insulation may be removed and, when the amount of the supplied negative charge is less than zero, potential difference may not be sufficient and, when the amount of supplied negative charge exceeds −100 kV, insulation may be removed.

In this case, an intensity of electric field between the nozzle 3 and the collector 4 applied by a high-voltage generator 6 and a voltage transfer road 5 is preferably 850 to 3,500 V/cm. When the intensity of the electric field is less than 850 V/cm, uniform thickness of nanofibers cannot be produced because the spinning solution is not continuously ejected, and production of the nanoweb may be difficult because the nanofibers formed after spinning cannot be smoothly collected on the collector and, when the intensity of electric field exceeds 3,500 V/cm, the nanofibers are not mounted at a desired position on collector 4, thus making acquisition of a nanoweb having a normal shape impossible.

Nanofibers having a uniform fiber diameter, preferably a mean diameter of 0.01 to 5 μm are produced by the spinning process, and the nanofibers are arranged in a predetermined direction or randomly to form a non-woven fabric.

The method of manufacturing a porous support may be a roll-to-roll method. Specifically, the nanoweb precursor produced by step 2 may be transferred to the subsequent step by a roll-to-roll method.

The nanoweb precursor thus transferred may be subjected to calendering before curing. The calendering process may be omitted, if necessary.

In order to form the nanoweb having a porosity and elongation at break described in an embodiment, the nanoweb precursor may be subjected to calendering. The calendering process may be carried out by passing a nanoweb precursor between a plurality of rollers, and applying a predetermined pressure to the nanoweb precursor by the rollers which contact both surfaces of the nanoweb precursor. In addition, when the nanoweb precursor is transferred by a roll-to-roll method, a plurality of rollers are installed on both surfaces of the nanoweb precursor at the position the nanoweb precursor passes, thereby simultaneously performing the process of producing the nanoweb precursor and the calendering process.

The calendering process may be carried out at a temperature of 20 to 100° C. When the temperature of calendering process is lower than 20° C., an effect of increasing a bridging area at the bridging point of the nanoweb precursor is not sufficient and the nanoweb precursor may be damaged by pressure applied by the calendering roller and, when the temperature of the calendering process exceeds 100° C., the nanoweb precursor may be non-uniformly cured and an appropriate strength cannot be thus obtained.

In addition, the linear pressure of the calendering process may be 80 to 200 kgf/cm. When the linear pressure of the calendering process is lower than 80 kgf/cm, an effect of increasing a bridging area at the bridging point of the nanoweb precursor and a nanoweb having an appropriate elongation cannot be formed and, when the linear pressure of the calendering process exceeds 200 kgf/cm, porosity and strength of the nanoweb precursor may be deteriorated.

In step 3, the nanofiber precursor of the nanoweb precursor is cured.

In order to convert the nanofiber precursor into the nanofibers, a curing process which is an additional process performed on the nanofiber precursor is conducted. For example, when the nanofiber precursor produced by electrospinning includes polyamic acid, the nanofiber precursor is converted into polyimide by imidization during the curing process.

Accordingly, the temperature of the curing process can be suitably controlled in consideration of conversion ratio of the nanofiber precursor. Specifically, the curing process may be conducted at 80 to 650° C. When the temperature during curing is lower than 80° C., conversion ratio is decreased and, as a result, the heat resistance and chemical resistance of the nanoweb may be deteriorated and, when the curing temperature exceeds 650° C., physical properties of the nanoweb may be deteriorated by degradation of the nanofibers.

In an embodiment, the temperature during the curing process can be controlled such that transverse direction (TD) curing shrinkage of the nanoweb precursor reaches 5 to 15%. When the curing shrinkage satisfies the range defined above, the produced nanoweb can have a porosity, a tensile strength and an elongation at break satisfying the range defined above. When the transverse direction (TD) curing shrinkage of the nanoweb is less than 5%, a nanoweb having an appropriate tensile strength cannot be formed and, when the transverse direction curing shrinkage exceeds 15%, the problem of wrinkling may occur by shrinkage. In order to obtain the curing shrinkage ratio, the curing temperature can be controlled to 300 to 500° C.

When, in step 3, the nanoweb precursor is transferred by a roll-to-roll method, a production process of the nanoweb precursor and a curing process thereof can simultaneously performed by installing a heater at the position the nanoweb precursor passes.

When a roll-to-roll method is used to produce the nanoweb, a nanoweb having the porosity and elongation at break described above can be provided by controlling MD and TD tensions. The MD is a machine direction which is a direction in which a nanoweb precursor or nanoweb is moved by a roll-to-roll method. In addition, TD is a transverse direction which is a direction vertical to the direction in which the nanoweb precursor or nanoweb is moved.

Specifically, the aforementioned nanoweb can be provided by controlling the nanoweb precursor to have identical MD and TD tensions.

In an embodiment, the nanoweb precursor can be transferred by a roll-to-roll method without applying any tension to the nanoweb precursor. Specifically, the nanoweb precursor can be loaded in a conveyer belt so that it can be transferred without tension. As such, the nanoweb having an elongation at break described above can be provided without tension both in a machine direction and in a transverse direction of the nanoweb precursor.

In addition, in another embodiment, the nanoweb precursor can be transferred after being rolled with a roller wherein the nanoweb precursor can be transferred while applying a tension identical to tension applied to the machine direction of the nanoweb precursor in the transverse direction of the nanoweb precursor with the roller. Application of tension to the nanoweb precursor in a transverse direction, for example, includes fixing an edge of the nanoweb precursor with a clip or the like to apply tension to the nanoweb precursor in a transverse direction. When the identical tension is applied to both in a machine direction and in a transverse direction of the nanoweb precursor, the nanoweb having an elongation at break described above can be provided.

In accordance with another embodiment of the present invention, provided is a reinforced membrane which includes the porous support and an ion exchange polymer filling pores of the porous support.

A method of filling an ion exchange polymer in pores of the porous support is for example impregnation. The impregnation may be carried out by dipping the porous support in a solution containing an ion exchange polymer. In addition, the ion exchange polymer may be formed by dipping an associated monomer or low molecular weight oligomer in the porous support and polymerizing in-situ the same in the porous support.

The impregnation temperature and time may be affected by various parameters. For example, the impregnation temperature and time may be affected by the thickness of the nanoweb, concentration of the ion exchange polymer, the type of solvent, concentration of ion exchange polymer to be impregnated in the porous support and the like. The impregnation process may be carried out at a temperature of not less than a freezing point of the solvent and not higher than 100° C., more typically at room temperature to a temperature of 70° C. or lower. The temperature cannot be a melting point or higher of the nanofibers.

The ion exchange polymer may be a cation exchange polymer having a cation exchange group such as a proton, or an anion exchange polymer having an anion exchange group such as a hydroxyl, carbonate or bicarbonate ion.

The cation exchange group may be any one selected from the group consisting of a sulfonic acid group, a carboxyl group, a boronic acid group, a phosphoric acid group, an imide group, a sulfonimide group, a sulfonamide group and a combination thereof and is generally a sulfonic acid group or a carboxyl group.

The cation exchange polymer includes the cation exchange group and examples thereof include fluoro-based polymers containing fluorine in a main chain; hydrocarbon-based polymers such as benzimidazole, polyamide, polyamideimide, polyimide, polyacetal, polyethylene, polypropylene, acrylic resins, polyester, polysulfone, polyether, polyetherimide, polyester, polyethersulfone, polyetherimide, polycarbonate, polystyrene, polyphenylenesulfide, polyetheretherketone, polyetherketone, polyarylethersulfone, polyphosphazene or polyphenylquinoxaline; partially fluorinated polymers such as polystyrene-graft-ethylenetetrafluoroethylene copolymers or polystyrene-graft-polytetrafluoroethylene copolymers; and sulfone imide.

More specifically, when the cation exchange polymer is a hydrogen ion cation exchange polymer, the polymers may include, in a side chain, a cation exchange group selected from the group consisting of a sulfonic acid group, a carboxylic acid group, a phosphoric acid group, a phosphonic acid group and a derivative thereof, and examples thereof include, but are not limited to, a fluoro-based polymer including poly(perfluorosulfonic acid), poly(perfluorocarboxylic acid) including a sulfonic acid group, a copolymer of tetrafluoroethylene including a sulfonic acid group with fluorovinylether, defluorinated sulfide polyetherketone or a mixture thereof; and a hydrocarbon-based polymer including sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene and a mixture thereof.

The anion exchange polymer is a polymer which is capable of transferring an anion such as a hydroxyl, carbonate or bicarbonate ion, commercially available anion exchange polymers are hydroxides or halides (generally, chloride), and the anion exchange polymer may be used for industrial water purifications, metal separation or catalyst process and the like.

The anion exchange polymer is generally a metal hydroxide-doped polymer and specifically, is metal hydroxide-doped poly(ethersulfone), polystyrene, vinyl-based polymers, poly(vinyl chloride), poly(vinylidene fluoride), poly (tetrafluoroethylene), poly(benzimidazole) or poly (ethyleneglycol) or the like.

The ion exchange polymer may be present in an amount of 50 to 99% by weight with respect to the total weight of the reinforced membrane. When the content of the ion exchange polymer is less than 50% by weight, ion conductivity of the reinforced membrane may be deteriorated and, when the content of the ion exchange polymer exceeds 99% by weight, the mechanical strength and dimensional stability of the reinforced membrane may be deteriorated.

When the ion exchange polymers are filled in pores of the porous support, a coating layer may be formed on one or two surfaces of the porous support during the production process. The thickness of the coating layer of the ion exchange polymer is preferably controlled to 30 μm or less. When the coating layer of the ion exchange polymer is formed to a thickness of higher than 30 μm on the surface of the porous support, the mechanical strength of the reinforced membrane may be deteriorated, the total thickness of the reinforced membrane is increased and resistance loss is thus increased.

The reinforced membrane has a structure in which the ion exchange polymer is filled in pores of the porous support, thus exhibiting superior mechanical strength of 40 MPa or more. As such, as mechanical strength increases, the total thickness of the reinforced membrane can be reduced to 80 μm or less and, as a result, material costs are reduced, ion conduction speed is increased and resistance loss is reduced.

In addition, the reinforced membrane includes a porous support having superior durability and superior binding capability between nanofibers and the ion exchange polymer constituting the porous support, thereby preventing three-dimensional expansion of the reinforced membrane resulting from moisture and reducing length and thickness increase fractions. Specifically, the reinforced membrane has superior dimensional stability of 5% or less when swollen in water. The dimensional stability is a physical property which is evaluated in accordance with the following Equation 2 from variation in length before and after swelling of the reinforced membrane.

Dimensional stability=[(length after swelling−length before swelling)/length before swelling]×100    [Equation 2]

The reinforced membrane has superior dimensional stability and ion conductivity, thus being preferably useful for polymer electrolyte membranes for fuel cells or membranes for reverse osmosis filters.

Mode for Invention

Hereinafter, embodiments according to the present invention will be described in detail to such an extent that a person having ordinary knowledge in the art field to which the invention pertains can easily carry out the invention. However, the present invention can be realized in various forms and is not limited to embodiments stated herein.

Production Example: Production of Porous Support

Example 1

Polyamic acid having a viscosity of 2,600 poise was dissolved in a dimethylformamide solvent to prepare 5 L of a spinning solution having a solid content of 12.5% by weight and a viscosity of 620 poise. The prepared spinning solution was transferred to a solution tank, fed by a volumetric gear pump to a spinning chamber having 26 nozzles and to which a high voltage of 49 kV was applied and then spun to produce a nanoweb precursor. At this time, the amount of the supplied solution was 1.0 ml/min and a ratio of the distance between nozzle ends and the distance between nozzle centers was 1.02.

Subsequently, the nanoweb precursor was transferred by a roll-to-roll method and heat-cured in a continuous curing furnace at a temperature of 420° C. for 10 minutes to produce a porous support including the polyimide nanoweb. At this time, a rolling tension was 10N and the edge of the nanoweb precursor was fixed with a clip such that a tension of 10N was applied in a transverse direction (TD) of the nanoweb precursor.

Example 2

A porous support was produced in the same manner as in Example 1 except that, before curing, the nanoweb precursor was subjected to calendering at a pressure of 116.7 kgf/cm and at a temperature of 80° C.

Example 3

A porous support was produced in the same manner as in Example 1 except that the curing temperature was changed to 490° C.

Comparative Example 1

Polyamic acid having a viscosity of 2,600 poise was dissolved in a dimethylformamide solvent to prepare 5 L of a spinning solution having a solid content of 14% by weight and a viscosity of 900 poise. The prepared spinning solution was transferred to a solution tank, fed by a volumetric gear pump to a spinning chamber having 26 nozzles and to which a high voltage of 49 kV was applied, and then spun to produce a nanoweb precursor. At this time, the amount of the supplied solution was 1.0 ml/min and a ratio of the distance between nozzle ends and the distance between nozzle centers was 1.02.

Subsequently, the nanoweb precursor was transferred by a roll-to-roll method and heat-cured in a continuous curing furnace at a temperature of 420° C. for 10 minutes to produce a porous support including the polyimide nanoweb. At this time, a rolling tension was 10N.

Comparative Example 2

A porous support was produced in the same manner as in Comparative Example 1 except that a spinning solution having a solid content of 11% by weight and a viscosity of 170 poise which was prepared by dissolving polyamic acid having a viscosity of 2,600 poise in a dimethylformamide solvent.

Comparative Example 3

A porous support was produced in the same manner as in Comparative Example 1 except that the nanoweb precursor was heat-cured for one minute.

Test Example 1: Measurement of Physical Properties of Porous Support

The physical properties of the porous supports produced in Examples and Comparative Examples were measured and results are shown in the following Table 1.

TABLE 1

|  | Porosity | Tensile strength | Elongation at break |
|---|---|---|---|
| Example 1 | 85 | 25 | 2.1 |
| Example 2 | 80 | 32 | 2.4 |
| Example 3 | 84 | 30 | 1.9 |
| Comparative Example 1 | 69 | 38 | 1.7 |
| Comparative Example 2 | 96 | 16 | 0.9 |
| Comparative Example 3 | 82 | 8 | 0.4 |

(1) Porosity (unit: %): Porosity was calculated in accordance with ISO 15901-1: 2005 (Mercury porosimetry).
(2) Tensile strength (unit: MPa): the porous supports produced by Examples and Comparative Examples were cut to have a width of 25 mm (TD) and a length of 100 mm (MD), which are the conditions in accordance with KS M 7272. In addition, by the method in accordance with KS K 0521, 1 kg of a load cell was applied to the cut porous support using an Instron 5566 tester, tension was applied at a constant rate of 100 mm per minute and strength (kgf) was converted into MPa at break to measure tensile strength.
(3) Elongation at break (unit: %): the porous supports produced by Examples and Comparative Examples were cut to have a width of 25 mm (TD) and a length of 100 mm (MD), which are the conditions in accordance with KS M 7272. In addition, by the method in accordance with KS K 0521, 1 kg of a load cell was applied to the cut porous support using an Instron 5566 tester, tension was applied at a constant rate of 100 mm per minute and a ratio of an elongated length at break was calculated as a percentage.

Test Example 2: Evaluation of Performance of Porous Support

Ease of the process of producing reinforced membranes using the porous supports produced from Examples and Comparative Examples, and performance of the reinforced membrane produced from the porous support were evaluated and results are shown in the following Table 2.

TABLE 2

|  | Impregnation capability | Tensile strength of membrane | Symmetricity of reinforced membrane |
|---|---|---|---|
| Example 1 | excellent | 30 MPa | excellent |
| Example 2 | excellent | 37 MPa | good |
| Example 3 | good | 28 MPa | excellent |
| Comparative Example 1 | good | 35 MPa | bad |
| Comparative Example 2 | bad | 20 MPa | bad |
| Comparative Example 3 | bad | Measurement not Impossible | Measurement not Impossible |

(1) Impregnation capability: impregnation capability means work ease when an ion conductor is impregnated in porous supports produced in Examples and Comparative Examples and is classified into excellent, good or bad.
(2) Tensile strength of reinforced membrane: reinforced membranes produced by impregnating porous supports produced in Examples and Comparative Examples with an ion conductor were cut to have a width of 25 mm (TD) and a length of 100 mm (MD), which are the conditions in accordance with KS M 7272. In addition, by the method in accordance with KS K 0521, 1 kg of a load cell was applied to the cut reinforced membrane using an Instron 5566 tester, tension was applied at a constant rate of 100 mm per minute and strength (kgf) was converted into MPa at break to measure tensile strength.
(3) Symmetricity of reinforced membrane: after impregnating an ion conductor in porous supports produced in Examples and Comparative Examples, thicknesses of the ion conductor coating layer disposed on both surfaces of the porous support were compared. When the difference between the thicknesses of ion conductor coating layers disposed on both surfaces of the porous support is less than 1 μm, symmetricity was represented by "excellent", when the difference was 1 to 3 μm, symmetricity was represented by "good" and, when the difference was 3 μm or more, symmetricity was represented by "bad".

Although the preferred embodiments of the present invention have been disclosed for illustrative purposes, those skilled in the art will appropriate that various modifications, additions and substitutions are possible, without departing from the scope and spirit of the invention as disclosed in the accompanying claims.

INDUSTRIAL APPLICABILITY

The porous support according to the present invention has wide surface area and excellent porosity, thus being useful for a variety of applications such as filters for water purification, filters for air purification, composites, membranes for cells and the like, in particular, being useful for reinforced composite membranes for fuel cells for cars.

The invention claimed is:

1. A porous support comprising a nanoweb in which nanofibers are integrated in the form of a non-woven fabric including a plurality of pores,
    wherein the nanoweb has a porosity of 70 to 95% and an elongation at break of 1 to 10%, and
    wherein the nanoweb has a strain of 10 length % or less, said strain being determined by standing a sample of the nanoweb with a width 100 mm and a length of 100 mm at 200° C. for 24 hours and calculating an average of width strain and length strain, before and after standing, and
    wherein the nanoweb has an intermediate elongation of 0.7 to 5% under a load of 10.204 gf.

2. The porous support according to claim 1, wherein the nanoweb has a tensile strength of 10 to 50 MPa.

3. The porous support according to claim 1, wherein the nanoweb has a mean thickness of 5 to 50 μm.

4. The porous support according to claim 1, wherein the nanoweb has a basis weight of 2 to 10 g/m$^2$.

5. The porous support according to claim 1, wherein the nanoweb is a polyimide nanoweb.

6. A method of manufacturing a porous support comprising:

spinning a spinning solution to form a nanoweb precursor which includes in which nanofibers are integrated in the form of a non-woven fabric including a plurality of pores; and curing the nanoweb precursor while transferring the nanoweb precursor by a roll-to-roll method under the condition that a MD tension is equal to a TD tension, wherein the nanoweb has a strain of 10 length % or less, said strain being determined by standing a sample of the nanoweb with a width 100 mm and a length of 100 mm at 200° C. for 24 hours and calculating an average of width strain and length strain, before and after standing, and wherein the nanoweb has an intermediate elongation of 0.7 to 5% under a load of 10.204 gf.

7. The method according to claim 6, wherein the spinning solution is a solution comprising polyamic acid having a solid content of 11.5 to 13.5% by weight.

8. The method according to claim 6, further comprising calendering the nanoweb precursor at a linear pressure of 80 to 200 kgf/cm before curing the nanoweb precursor.

9. The method according to claim 6, wherein the curing the nanoweb precursor comprises curing the nanoweb precursor to adjust a transverse direction curing shrinkage of the nanoweb precursor to 5 to 15%.

10. The method according to claim 6, wherein the curing the nanoweb precursor is carried out at a temperature of 80 to 650° C.

11. The method according to claim 6, wherein the transferring the nanoweb precursor by a roll-to-roll method comprises transferring the nanoweb precursor by a roll-to-roll method without tension.

12. The method according to claim 6, wherein the transferring the nanoweb precursor by a roll-to-roll method is carried out while applying a tension identical to tension, which is applied to the machine direction of the nanoweb precursor, in the transverse direction of the nanoweb precursor with a roller, after rolling the nanoweb precursor with the roller.

13. A reinforced membrane comprising:
the porous support according to claim 1; and
an ion exchange polymer filling pores of the porous support.

* * * * *